US007323980B2

(12) United States Patent
Faulkner et al.

(10) Patent No.: US 7,323,980 B2

(45) Date of Patent: *Jan. 29, 2008

(54) SECURITY SYSTEM AND METHOD WITH REALTIME IMAGERY

(76) Inventors: James Otis Faulkner, 117 Mimosa Dr., Cambridge, MD (US) 21613; Richard Marvel Blake, 54 Algonquin Rd., Cambridge, MD (US) 21613

( * ) Notice: Subject to any disclaimer, the term of this patent is extended or adjusted under 35 U.S.C. 154(b) by 180 days.

This patent is subject to a terminal disclaimer.

(21) Appl. No.: 10/903,857

(22) Filed: Aug. 2, 2004

(65) Prior Publication Data

US 2005/0068175 A1 Mar. 31, 2005

Related U.S. Application Data

(63) Continuation-in-part of application No. 10/339,462, filed on Jan. 10, 2003, now Pat. No. 6,778,085, which is a continuation-in-part of application No. 10/271,744, filed on Oct. 17, 2002, now Pat. No. 6,798,344.

(60) Provisional application No. 60/393,942, filed on Jul. 8, 2002.

(51) Int. Cl.

| | |
|---|---|
| ***G08B 19/00*** | (2006.01) |
| ***G08B 7/00*** | (2006.01) |
| ***H04N 7/08*** | (2006.01) |
| ***G06K 9/00*** | (2006.01) |

(52) U.S. Cl. ................ 340/521; 340/539.25; 340/506; 340/541; 382/103; 348/143

(58) Field of Classification Search ................ 340/521, 340/539.25, 539.18

See application file for complete search history.

(56) References Cited

U.S. PATENT DOCUMENTS

| | | | | |
|---|---|---|---|---|
| 5,666,157 | A * | 9/1997 | Aviv | 348/152 |
| 5,694,867 | A | 12/1997 | Diaz-Lopez | |
| 5,917,405 | A * | 6/1999 | Joao | 340/426.17 |
| 5,926,210 | A | 7/1999 | Hackett et al. | |
| 6,400,265 | B1 | 6/2002 | Saylor et al. | |
| 6,476,858 | B1 | 11/2002 | Ramirez Diaz et al. | |
| 6,504,479 | B1 | 1/2003 | Lemons et al. | |
| 6,559,769 | B2 * | 5/2003 | Anthony et al. | 340/574 |
| 6,778,085 | B2 * | 8/2004 | Faulkner et al. | 340/541 |
| 6,914,896 | B1 | 7/2005 | Tomalewicz | |
| 6,915,208 | B2 | 7/2005 | Garin et al. | |
| 2002/0005894 | A1 | 1/2002 | Foodman et al. | |
| 2002/0018124 | A1 | 2/2002 | Mottur et al. | |
| 2002/0106998 | A1 | 8/2002 | Presley et al. | |
| 2002/0147982 | A1 * | 10/2002 | Naidoo et al. | 725/105 |
| 2003/0025599 | A1 * | 2/2003 | Monroe | 340/531 |
| 2003/0041330 | A1 | 2/2003 | Smith | |
| 2003/0058084 | A1 * | 3/2003 | O'Hara | 340/5.53 |

(Continued)

*Primary Examiner*—Donnie L. Crosland

(74) *Attorney, Agent, or Firm*—McKenna Long & Aldridge LLP

(57) ABSTRACT

A security alarm system that provides secure, realtime video and/or other realtime imagery of a secured location to one or more emergency response agencies over a high-speed communications link, such as an Internet link. Realtime video and/or realtime imagery, along with other useful information is therefore placed directly into the hands of those who are called upon and trained to respond to a potential emergency. As such, the emergency response agencies and their personnel are better informed. This, in turn, allows the personnel to be better prepared in their response to potential emergencies or acts of terrorism, saving manpower, money, lives and reducing the number of false alarms.

31 Claims, 5 Drawing Sheets

U.S. PATENT DOCUMENTS

| | | | |
|---|---|---|---|
| 2003/0086000 | A1 | 5/2003 | Siemens et al. |
| 2003/0094541 | A1 | 5/2003 | Zeineh |
| 2003/0117494 | A1 | 6/2003 | Poblete |

* cited by examiner

SECURITY SYSTEM AND METHOD WITH REALTIME IMAGERY

This application is a continuation-in-part of U.S. Pat. application Ser. No. 10/339,462, now U.S. Pat. No. 6,778,085, filed on Jan. 10, 2003, which is a continuation-in-part of U.S. patent application Ser. No. 10/271,744, now U.S. Pat. No. 6,798,344, filed on Oct. 17, 2002, which claims priority from U.S. Provisional Patent Application No. 60/393,942, filed on Jul. 8, 2002, where the entire content of all three applications are hereby incorporated by reference.

BACKGROUND OF THE INVENTION

1. Field of the Invention

The present invention is directed to security alarm systems, including residential and commercial security alarm systems, as well as other types of security systems designed to safeguard property, people and the public at large against potential emergencies including acts of terrorism. More particularly, the present invention involves enhancing security alarm systems through the use of realtime video or realtime image information, as well as other types of information to assist those who have been entrusted with the job of responding to these situations.

2. Background Information

Security alarm systems are widely used to protect property as well as personal safety. Typically, these systems do so by generating an alarm in response to any number of events, such as unauthorized entry, fire, a medical emergency or manual alarm activation. Some systems provide a service which remotely monitors the status of the security alarm system. Thus, if the security alarm system generates an alarm, an alarm notification signal is transmitted via a hardwire and/or wireless communications link to a central station. Upon receiving the alarm notification signal, security service personnel at the central station may attempt to contact the client (i.e., the party at the secured location) to verify the alarm. If it is appropriate to do so, the security service personnel may, upon confirmation of the alarm, contact an emergency response agency (e.g., the police department, the fire department or an emergency medical team).

More recently, security services have added video capability to their security alarm systems. Thus, in addition to transmitting an alarm notification signal, the security alarm system also transmits a video signal to the central station. Like the alarm notification signal, the video signal is transmitted from the secured location to the central station over a hardwire and/or wireless connection. While video does provide additional information, the value of that additional information is of limited value if it is not available to the appropriate emergency response agency or agencies and their highly trained professional emergency response personnel.

SUMMARY OF THE INVENTION

The present invention enhances security alarm systems, and security services in general, by providing secure realtime video or image information, as well as other pertinent information relating to the emergency, to the appropriate emergency response agency or agencies. The enhancement places realtime video, image or other information directly into the hands of those who are called upon and trained to respond to potential emergencies, such as medical emergencies, fire, threats of violence and even acts of terrorism.

These agencies and their personnel are then better informed. This, in turn, allows them to be better prepared in responding to and hopefully preventing such emergencies.

It is, therefore, an object of the present invention to provide an enhanced security alarm system, and more generally, an enhanced security alarm service with realtime video, or imaging capability, as well as the capability to provide other pertinent and/or critical information.

It is also an object of the present invention to provide the appropriate emergency response agency or agencies with realtime video, image or other information so emergency response agency personnel are better informed with respect to a potential emergency.

It is still another object of the present invention to provide the appropriate emergency response agency or agencies with realtime imagery and/or other additional information to assist emergency response agency personnel in assessing a potential emergency and in making proper decisions regarding response strategies, manpower and equipment.

In accordance with a first embodiment of the present invention, the aforementioned and other objectives are achieved through a security system that includes an imaging device positioned at a secured location and means, associated with a central station, for receiving and processing realtime imagery which is generated by the imaging device and received over a communications link. The system also includes means, associated with an emergency response agency, for receiving, processing and displaying realtime imagery generated by the imaging device and received over a communications link from the central station.

In accordance with a second embodiment of the present invention, the aforementioned and other objectives are achieved through a security system that includes an imaging device positioned at a secured location and a server, which includes means for receiving realtime imagery from the imaging device. The system also includes a computer system associated with a central station, where the computer system comprises means for processing realtime imagery received from the server over a network connection. In addition, the system includes a computer system associated with an emergency response agency, where the computer system comprises means for processing and displaying the realtime imagery which is received over a network connection from the computer system associated with the central station.

In accordance with still another embodiment of the present invention, the aforementioned and other objectives are achieved by a method of securing a location. The method involves generating realtime imagery of a secured location and transmitting this realtime imagery to a security system central station over a network connection. The realtime imagery is then transmitted from the security system central station to an emergency response agency over a network connection. At the emergency response agency, the realtime imagery is displayed.

BRIEF DESCRIPTION OF THE DRAWINGS

Other objects and advantages of the present invention will become apparent to those skilled in the art from the following detailed description when read in conjunction with the accompanying drawings wherein.

DETAILED DESCRIPTION OF THE PREFERRED EMBODIMENTS

To facilitate an understanding of the present invention, reference will be made to a "secured location." It will be understood that the term "secured location" may refer to residences, commercial properties, public venues, such as hospitals and sports arenas, government facilities, military installations and any other location, outside or inside, which is protected by a security alarm system or, more generally, a security system according to exemplary embodiments of the present invention. Furthermore, it will be understood that the term "alarm" refers to any type of alarm, unless otherwise specified, such as an alarm which is, for example, activated in response to a forced/unauthorized entry, smoke/fire, a medical emergency or manual alarm activation.

Figure 1:
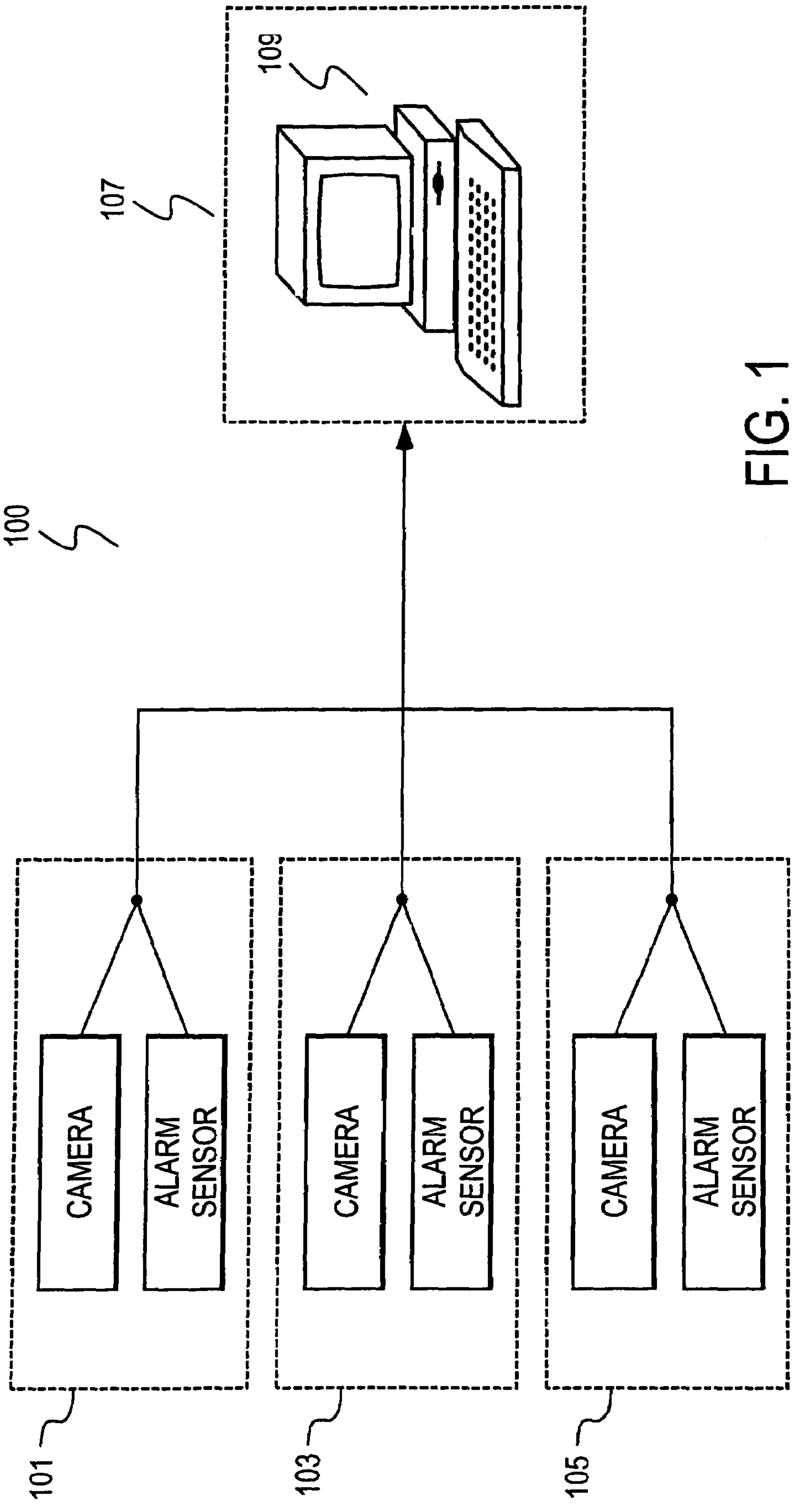
FIG. 1 (PRIOR ART)
FIG. 1 is a diagram illustrating a conventional security alarm system with video capability.

FIG. 1 illustrates a conventional security alarm system 100 which has a video capability. As shown, the system 100 includes at least one camera and one or more alarm sensors (i.e., transducers) positioned at a number of secured locations 101-105. The security system 100 also includes a central monitoring station 107 which is typically staffed by personnel employed by a security service. At the central station 107, there is equipment 109 including computer hardware and software that is capable of receiving, processing and displaying the video information which is transmitted from one or more secured locations.

The security alarm system 100 depicted in FIG. 1 works in the following manner. When one or more of the alarm sensors positioned, for example, at the secured location 103 detect an alarm condition, an alarm notification signal is transmitted from the secured location 103 to the central station 107, along with a video signal. The video signal is then processed and displayed for security service personnel, who may proceed by placing a telephone call to the secured location 103 to verify the alarm. If the alarm is confirmed, the security service personnel will typically call the local 911 operator or some other designated telephone number assigned to the appropriate emergency response agency. The 911 operator would then relay the information (i.e., the alarm notification) to the appropriate emergency response agency. The emergency response agency, based solely on the telephone call from the 911 operator, then dispatches their own personnel, with little or no additional information which might have been otherwise provided by the video.

Figure 2:
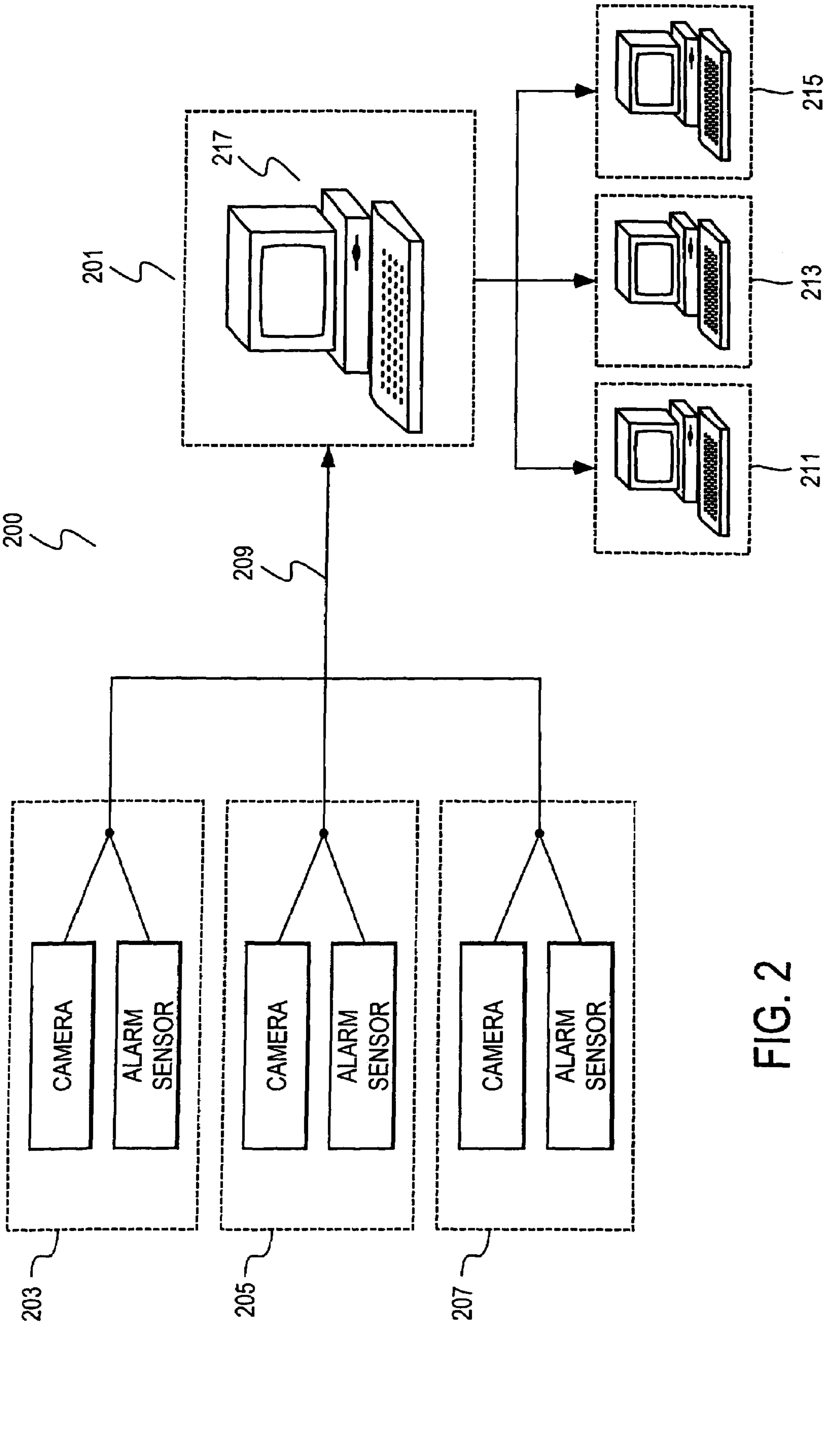
FIG. 2 is a diagram illustrating a security alarm system in accordance with exemplary embodiments of the present invention.

FIG. 2 illustrates a security alarm system 200 in accordance with exemplary embodiments of the present invention. As shown, there is a central monitoring station 201 which is connected to a number of secured locations 203207 via a high-speed communications link 209 (e.g., a high-speed telephone or cable connection). At each secured location 203-207, there is at least one video camera and one or more alarm sensors. The central station 201 is also connected via a high-speed communications link to one or more emergency response agencies 211-215. In accordance with the present invention, the central monitoring station 201 may be associated with a private security service or a government agency. In addition, the emergency response agencies may be local, state or federal agencies.

If an alarm sensor positioned at secured location 203, for example, detects an alarm condition, an alarm notification signal and a realtime video signal are transmitted to the central monitoring station 201 over the high-speed communications link 209. At the central station 201, the realtime video is received, processed and, if desired, displayed using the computer system 217. Additionally, the realtime video may be recorded, i.e., stored for later use. While FIG. 2 shows the computer system 217 physically located at the central monitoring station 201, it will be understood that the computer system 217 may, in fact, be placed at a location other than the location of the central monitoring station 201.

In accordance with exemplary embodiments of the present invention, the video signal is simultaneously transmitted from the computer system 217 associated with the central station 201 to a computer system, or systems, associated with each of one or more emergency response agencies 211-215. The computer systems associated with the emergency response agencies 211-215 are similar to computer system 217, as they are employed to receive, process and display realtime video. It should be noted that the computer system 217 associated with the central station 201 and the computer systems associated with the emergency response agencies 211-215 may record the realtime video for later use. Like computer system 217, any computer system associated with the one or more emergency response agencies 211-215 may be physically located at the corresponding emergency response agency or, alternatively, placed in a location other than the location of the emergency response agency.

In a preferred embodiment of the present invention, the video would only be displayable at an emergency response agency upon entry of a valid password, thus preventing unauthorized individuals from accessing the video. In other exemplary embodiments, authorization to access the video may or may not be necessary; if required, however, authorization may be automated, thus precluding the need to enter a valid password. By providing realtime video for the emergency response agencies 211-215, the trained personnel at these agencies are better equipped to assess a potential emergency in realtime, as they have been trained to do, and make more timely and informed decisions regarding the way in which they respond.

Figure 3:
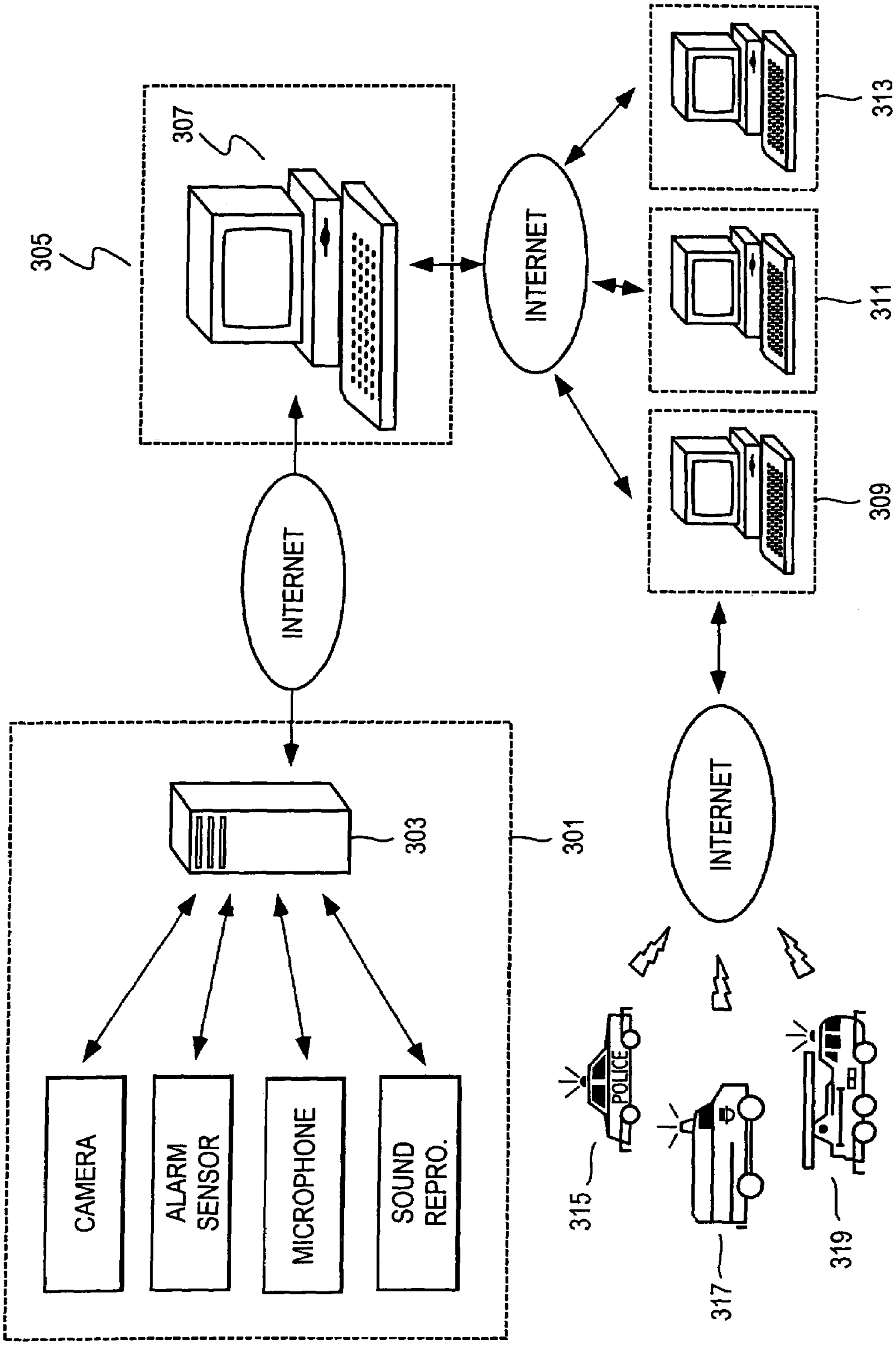
FIG. 3 is a diagram illustrating a security alarm system providing realtime video for one or more emergency response agencies and emergency response personnel, in accordance with exemplary embodiments of the present invention.

FIG. 3 illustrates, in greater detail, a security alarm system 300 for a given secured location 301, in accordance with exemplary embodiments of the present invention. As shown, there is at least one camera and one or more alarm sensors positioned at the secured location 301. The at least one camera and the one or more alarm sensors communicate with a server 303 over a hardwired and/or wireless connection.

The security alarm system 300 includes a computer system 307 associated with the central monitoring station 305. The computer system 307, which comprises hardware and software, is configured to communicate with the server 303 over a high-speed communications link 304. In the embodiment illustrated in FIG. 3, the communications link 304 is achieved over the Internet, using hardwire (e.g., high-speed telephone or cable lines) and/or wireless technology. It will be understood that the communications link 304 may be achieved over network connections other than Internet connections, for instance, intranet connections, virtual private network (VPN) connections, or a combination thereof. The computer system 307 is also configured to communicate with computer systems, including hardware and software, associated with each of a number of emergency response agencies 309-313 over a high-speed communications link similar to communications link 304.

The embodiment illustrated in FIG. 3 shows that the realtime video may also be transmitted to various mobile emergency response units 315-319. In the case of the police department, a mobile emergency response unit may consist of one or more police officers in a police vehicle. In the case of the fire department, a mobile emergency response unit may consist of fire fighting personnel in a fire truck. In the case of an emergency medical team, the mobile response unit may consist of emergency medical technicians in an ambulance. As these emergency response units are mobile, the high-speed communications link between a corresponding emergency response agency, for example, emergency response agency 309 and mobile emergency response unit 315, is achieved, at least in part, by a wireless connection. As one skilled in the art will readily appreciate, the mobile equipment employed by the emergency response units 315-319 to receive, process and display the video might take the form of a laptop computer, a mobile telephone or personal digital assistant, or any other type of portable communications device that is capable of receiving, processing and displaying video over a high-speed communications link, such as an Internet link. By placing the video directly into the hands of the emergency response units, those who are specifically charged with responding to a potential emergency now have a great deal more information to assist them in assessing and responding to the emergency situation.

Figure 4:
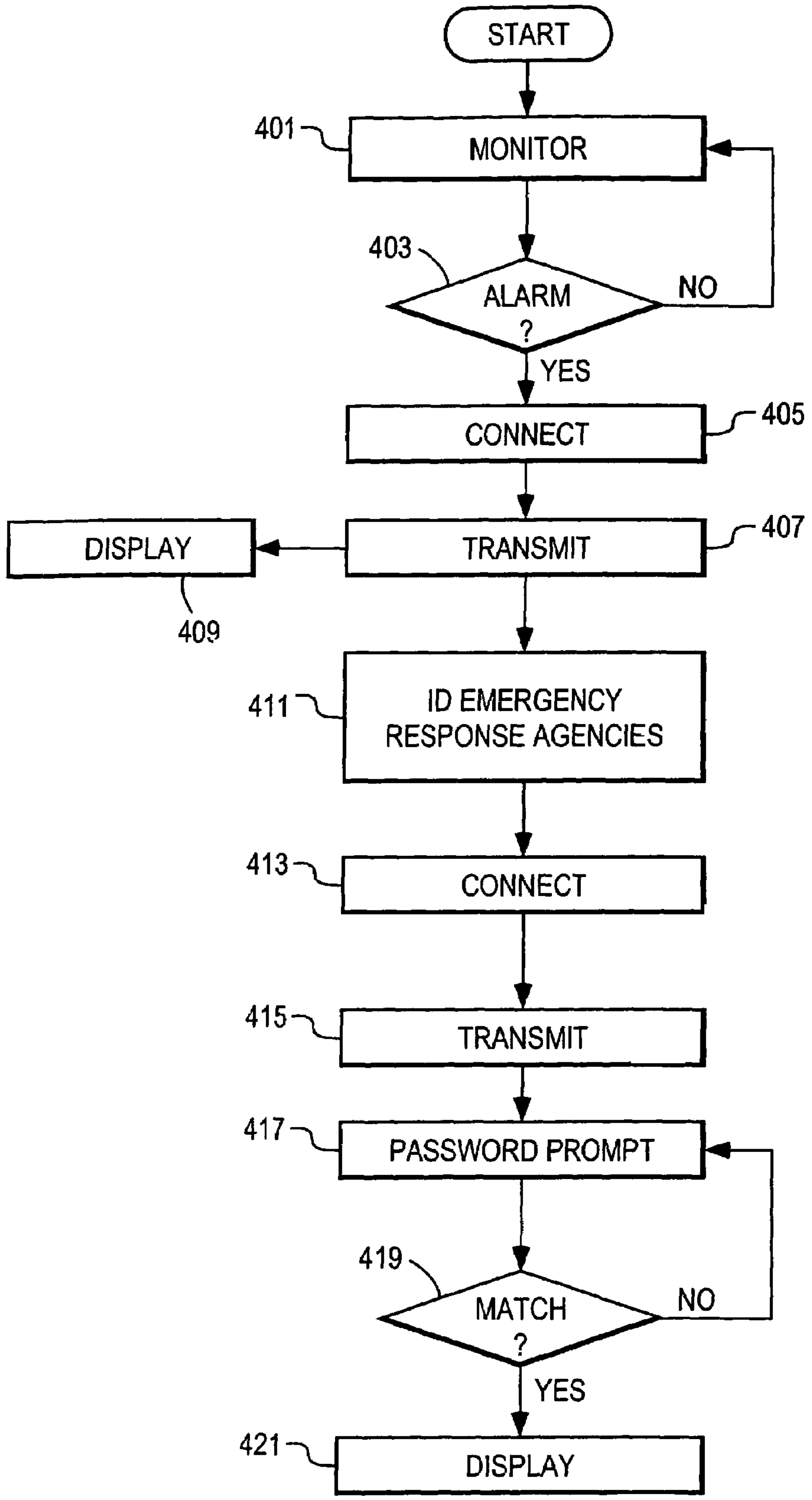
FIG. 4 is flowchart illustrating a method for providing secure, realtime video of a secured location to an emergency response agency, in accordance with exemplary embodiments of the present invention.

FIG. 4 is a flowchart depicting a method of providing realtime video for various emergency response agencies over high-speed communications links in conjunction with a security alarm system, such as the security alarm system 300 in FIG. 3. It will be understood that this method is exemplary and that other methods employing steps similar to those described below may be used to achieve similar results. Furthermore, it will be understood that this method may be implemented through a combination of computer hardware and software associated with the server 303 at the secured location 301, the computer systems associated with the central station 305 and the one or more emergency response agencies 309-313 and, if applicable, the communications devices associated with the mobile emergency response units 315-319. Further still, the method illustrated in FIG. 4 involves the establishment of Internet connections; however, as set forth above, other networks and other network connections may be used.

Referring first to step 401, the video 303, following a power-on and initialization process, monitors the status of the one or more sensors positioned at the secured location 301. This step may involve, for example, repeatedly determining the value of a multi-bit data register, where each bit reflects the status of a corresponding alarm sensor. If, in accordance with the “NO” path out of decision step 403, it is determined that the status of the one or more alarm sensors has not changed (i.e., that there is no indication of an alarm situation), the server 303 will continue to monitor the status of the sensors. If, however, the server 303 detects a change in the status of one or more alarm sensors, in accordance with the “YES” path out of decision step 403, the server 303 initiates the process of establishing an Internet connection with the computer system 307 associated with the central station 305 using the Internet Protocol (IP) address of the server 303 and the IP address of the computer system 307, as shown by step 405. As soon as the connection is established, the server 303 transmits an alarm notification signal to the computer system 307, as well as a realtime signal associated with one or more cameras positioned at the secured location 301, per step 407.

Upon receiving the alarm notification signal at the central station 305, the realtime video information associated with the realtime video signal is displayed using computer system 307, as indicated by step 409. In a preferred embodiment, information identifying the secured location 301 (e.g., a name or postal address associated with the secured location) is simultaneously displayed along with any other pertinent information that might be of assistance to the security service personnel at the central station 305.

Upon receiving the alarm notification signal at the central station 305, a number of emergency response agencies associated with the secured location 301 are identified, as shown in step 411. The process of identifying and, for that matter, selecting these agencies may be achieved by maintaining the identity (e.g., the IP address) of all possible emergency response agencies associated with the secured location. The selection and identification of specific agencies, from amongst the list of all possible agencies, will depend on a number of factors. One factor may be the type of alarm generated at the secured location 301. For this to be a factor, the alarm notification signal transmitted by the server 303 must identify the type of alarm which triggered the transmission of the alarm notification and realtime video signals. Moreover, the computer system 307 must be capable of distinguishing or extracting that information from the alarm notification signal. Another factor may be the address (i.e., the postal address) of the secured location. Thus, for example, if the server 303 transmits an alarm notification signal indicating an unauthorized entry at 115 East Main Street, the police department or, if appropriate, a particular police precinct responsible for the geographical region covering 115 East Main Street would be identified and selected as a result of step 411. If, on the other hand, the alarm notification signal indicated a fire at 115 East Main Street, the fire department would be identified and selected as a result of step 411.

In accordance with step 413, once the appropriate emergency response agency (or agencies) has been identified and selected, an Internet connection is established between the computer system 307 and the computer system associated with the identified and selected emergency response agency, for example, emergency response agency 309. Again, the Internet connection would be based on the IP address of computer system 307 and the IP address of the computer system at the emergency response agency 309. Then, in accordance with a preferred embodiment and step 415, the computer system 307 begins transmitting the realtime video signal to the computer system associated with the emergency response agency 309 via the Internet connection.

Prior to generating the Internet connection between the computer system 307 and the computer system associated with the selected emergency response agency, in accordance with step 413, it may be desirable to have computer system 307 transmit a message, control signal or the like to the computer associated with the emergency response agency, where the message or control signal provides an alarm notification. In addition, the message or control signal may contain a network address (e.g., a URL). Establishing the Internet connection, per step 413, and initiating the transmission of the realtime video occurs if the emergency response agency personnel navigate to that network address.

It should be noted that the alarm notification may be provided in a form other than a network message or control signal. It may, for example, take the form of a telephone call to the emergency response agency, to convey the network address at which the realtime video may be accessed.

In order to prevent unauthorized persons from accessing the realtime video signal, the computer system at the emergency response agency 309 may prompt the operator to enter a secure password, as shown in step 417. If the operator does not enter a valid password, in accordance with the "NO" path out of decision step 419, the computer system at the emergency response agency 309 will reprompt the operator. After a number of unsuccessful attempts to enter a valid password, the connection between the computer system 307 and the computer at emergency response agency 309 may be terminated.

In one alternative embodiment, the computer system 307 may, after the establishment of the Internet connection with the computer system associated with the emergency response agency 309, require that a valid password be entered before transmitting the realtime video signal to the emergency response agency 309. In either case, the entry of a valid password, in accordance with the "YES" path out of decision step 419 results in realtime video being simultaneously displayed on the computer systems associated with the central station 305 and the emergency response agency 309, per method steps 409 and 421.

In another alternative embodiment, entry of a password would be unnecessary. As stated above, authorizing access to the realtime video may be automated in some instances.

If, as shown in FIG. 3, the realtime video signal is forwarded from the computer system associated with the emergency response agency 309 to communications equipment associated with one or more mobile response units 315-319, method steps 413-421 depicted in FIG. 4, or substantially similar steps would be executed. The result would include the establishment of an Internet connection, or other network connections as suggested above, between the computer system associated with the emergency response agency 309 and the communications equipment associated with one or more mobile response units 315-319, based on the IP address of the computer system at the emergency response agency 309 and the present mobile IP address of communications equipment associated with each of the one or more mobile response units 315-319, where it will be understood that mobile IP addresses may change during the existence of the Internet connection depending upon the geographical location of the corresponding mobile response unit and the strength of the network signal over which the mobile unit is communicating.

In another embodiment of the present invention, an Internet connection may be established between the server 303 at the secured location and a computer system associated with the at least one or more emergency response agencies 309-313. As such, realtime video would be transmitted from the server 303 directly to the one or more emergency response agencies. However, there are advantages associated with routing the realtime video signal through the security service central station 305. One important advantage is, the security service personnel at the central station 305 may be able to prevent the transmission, or terminate the transmission, if it is determined that the alarm is false, before the emergency response agency expends time and manpower responding to the alarm.

In still another alternative embodiment, the server 303, as mentioned above, may transmit a video signal that includes video from multiple cameras positioned at the secured location 301. If this is the case, the computer system 307 associated with the central station 305 will distinguish video information associated with one camera from video information associated with another camera or cameras positioned at the secure location 301. This may, for example, be accomplished by including an identification code in the header portion of each video packet transmitted from the server 303, where the identification code identifies the video information contained in the corresponding video packet as being associated with a specific one of the multiple cameras. Further in accordance with this alternative embodiment, the central station 305, by virtue of its ability to distinguish one stream of video information from another, the computer system 307 at the central station 305 can display the video associated with each of the multiple cameras either separately, simultaneously, selectively or in a repetitive, cyclical sequence.

Figure 5:
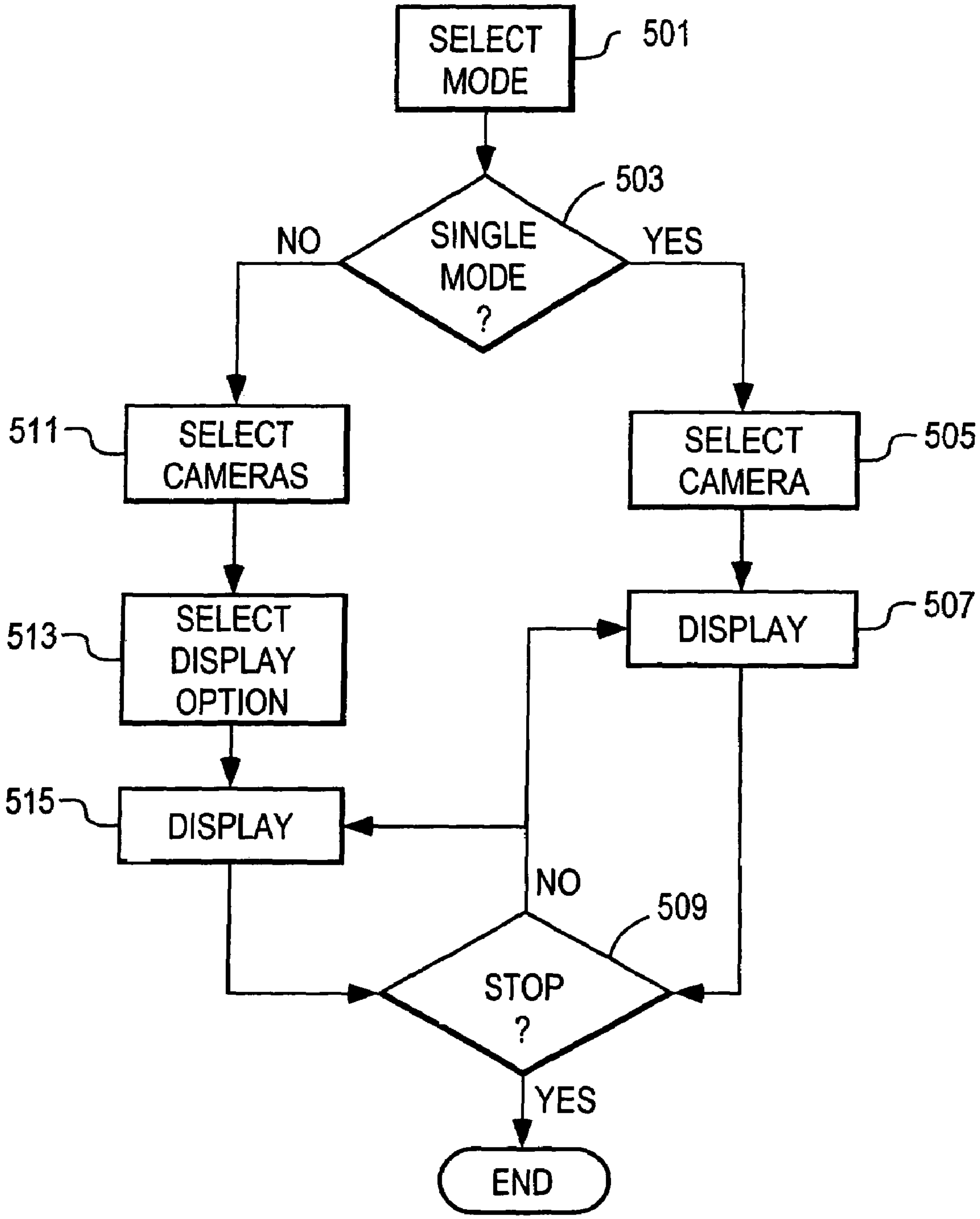
FIG. 5 is a flowchart illustrating a method for selecting one or more cameras which provide realtime video for use in a security alarm system, in accordance with exemplary embodiments of the present invention.

FIG. 5 is a flowchart depicting an exemplary method that may be employed to handle the selection and display of video from multiple cameras positioned at a secured location. As shown in step 501, the operator at the central station 305, and/or the operator at the emergency response agency 309 selects single camera or, if applicable, multiple camera mode. If the operator selects the single camera mode, in accordance with the "YES" path out of decision step 503, the operator then selects the camera or particular video stream of interest, per step 505. Step 505 may be achieved by displaying a list of cameras from which the operator may select. If there is only one camera positioned at the secured location 301, step 505 may be accomplished automatically, without the need for the operator to make a selection. The video associated with the selected camera would then be displayed, per method step 507 and the "NO" path out of decision step 509, until the process is terminated according to the "YES" path out of decision step 509.

If the operator selects the multiple camera mode, in accordance with the "NO" path out of decision step 503, the operator then selects the cameras or video streams of interest, as shown in step 511. The operator then selects the display option according to step 513. As stated, the various display options may include simultaneously displaying each of the multiple video streams, for example, on a split screen or multiple screens, or by displaying each on a full screen in a repeating sequence. The video would then be displayed, according to step 515, based on the operator selections, until the process is terminated per the "YES" path out of decision step 509.

Thus far, the present invention has been described in terms of a security alarm system in which realtime video information is transmitted from a video server at a secured location to an appropriate emergency response agency, and possibly, to appropriate mobile emergency response units via a security service central station over high-speed communications links. However, one of ordinary skill in the art will appreciate other uses for the present invention. One such alternative use is the ability for a homeowner or business owner (herein "the client") to periodically check on the secured location. Assuming the high-speed communications link is, once again, implemented over the Internet, the client connects to a web-site associated with the security service central station. Then, through selectable on-screen options, the client establishes a connection with the video server at his or her place of residence or business. Realtime video would then be transmitted to the client, who could then display the video on a desktop or mobile communication device, including an Internet capable mobile telephone or personal digital assistant. Thus, for example, a homeowner would be able to check on things at home, an anxious parent would be able to check on a child, and a business owner would be able to make sure things were secure at his or her place of business.

Although the focus thus far has been on realtime video, imaging devices other than video cameras may be employed without departing from the spirit of the present invention. Alternative imaging devices may include, for example, infrared (IR) sensors or passive millimeter-wave (PMMW) sensors to name just a few. Like the video camera described above with reference to the security alarm system 300 illustrated in FIG. 3, an alternative imaging device, such as an IR sensor or a PMMW sensor, would be installed and operated in a substantially similar manner. Thus, images generated by any alternative device would be transmitted over a high-speed communications link, such as communications link 304, to the computer system 307 associated with the central station 305. The images would also be transmitted in realtime, as described above, from the computer system 307 to one or more appropriate response agencies 309-313 and/or response units 315-319.

As stated, one alternative to the video camera is an IR sensor. IR sensors are well-known. They are particularly common in military imaging applications. IR sensors are capable of detecting heat emissions from objects that are within the sensor's field of view. Objects emitting less heat generally appear relatively dark in an IR image, whereas objects emitting more heat generally appear bright in the IR image. Since IR sensors respond to heat rather than visible light, as do standard video cameras, IR sensors may be used in situations where there is little or no ambient light. Such situations might include providing images of large open areas, such as government or military installations, particularly at night, or large indoor facilities, such as warehouses, where there is, as stated, little or no ambient light. Once again, in a preferred embodiment of the present invention, as illustrated in FIG. 3, realtime IR images would be transmitted over a high-speed communications link 304, to computer system 307 associated with the central station 305, and to similar computer systems associated with the one or more emergency response agencies 309-313 and/or emergency response units 315319.

Another alternative to the video camera is the passive millimeterwave (PMMW) sensor. Unlike IR and optical wavelength sensors, PMMW sensors respond to extremely small wavelengths. Consequently, they can penetrate, among other things, opaque solids including fabrics, leather and sheetrock. Moreover, the energy emissivity of objects at these wavelengths is approximately 10× that of IR wavelengths. Accordingly, PMMW sensors would be useful in detecting concealed objects or other contraband made of plastic, metal and other like materials, perhaps at airports, rail and/or bus stations, public gatherings, sporting events and government and/or military facilities. Images of concealed weapons or other potentially dangerous items, as well as images of those concealing them would, as described above in accordance with exemplary embodiments of the present invention, be transmitted over a high-speed communications link 304, to computer system 307 associated with the central station 305, and to similar computer systems associated with the one or more emergency response agencies 309-313 and/or emergency response units 315-319.

Further in accordance with exemplary embodiments of the present invention, information other than realtime images, which could nevertheless assist response agencies respond to potential emergencies, may be transmitted along with the realtime imagery. This additional information would be accessible to the computer system 307, which is associated with the central station 305. Thus, when the computer system 307 receives an alarm notification signal from the server 303, it may employ the identity information contained therein, as explained above and retrieve any additional information. The additional information would then be available for transmission to the one or more emergency response agencies 309-313, along with the realtime imagery.

In one example, the additional information may provide a cursory assessment of the potential emergency situation. For instance, the additional information may define the type of alarm that was generated at the secured location 301 (e.g., fire, unauthorized entry, medical emergency). The additional information may describe the extent of the potential emergency, such as, the degree to which a fire has spread throughout the secured location 301. Still further, the additional information may simply establish that one or more individuals appear to be present at the secured location 301. Regardless, it will be appreciated that this additional information may be automatically generated by the computer system 307, associated with the central monitoring station 305, and forwarded to the one or more emergency response agencies 309-313. Alternatively, the additional information may be generated by security service personnel and forwarded over the high-speed communications link in the form of a text signal, a voice signal, or various equivalents thereof.

In another example, the additional information may include data relating to the secured location 301. This additional information may relate, for example, to a structural attribute(s) associated with the secured location, such as a building layout, a floor plan or locations of cameras positioned throughout the secured location. Thus, if the realtime imagery indicates an intruder at the secured location 301, the additional information may provide law enforcement personnel the location of all possible escape routes. In the event of a fire, such information may provide the best way into and out of a building. Alternatively, the additional information may specify items or things maintained at the secured location (e.g., hazardous materials). Having this information might provide an indication as to what an intruder is seeking at the secured location. Still further, the additional information may convey certain conditions at the secured location, for example, the temperature, pressure, toxicity levels or the presence of particular chemical compounds in the air. Of course, in order to convey this latter information, the security system in place at the secured location would have to include the appropriate sensors.

In still another example, the additional information may provide data about a particular person or persons who have been detected from analyzing the realtime imagery. For instance, certain imaging sensors that have the capability to provide very high resolution images may be employed to provide facial, thumb, eye or other biometric scans. This information may be transmitted to the computer system 307 at central station 305. The computer system 307 could then analyze the biometric information, for example, by comparing the biometric information to information stored in a database to which the computer system 307 has access. If, based on the analysis of the biometric information, a concern arises over a given individual entering the secure location, property, building or event, an alarm or other similar signal may be generated in order to alert the appropriate emergency response agency. Moreover, the realtime images of and/or additional information relating to the secured location, property, building or event, as well as information relating to the individual may be transmitted to the appropriate emergency response agency in accordance with the exemplary embodiments of the present invention, as described herein.

Consider, for instance, a sports event which is attended by tens-of thousands of spectators. In accordance with the above-identified example, each spectator, upon entering the sports venue, would knowingly or unknowingly be exposed to a facial scan. The facial scans would be transmitted to computer system 307 which, in turn, compares the facial scans to data stored in a database (e.g., a government database). It will be understood that the computer system 307 in the present example may be located at, or more generally stated, associated with a government agency such as the National Security Agency (NSA). If a comparison between a given facial scan and data stored in the database gives rise to a security concern over a particular individual, the computer system 307 may generate an alarm signal or an equivalent thereof in order to immediately notify the appropriate emergency response agency, or agencies, such as the Federal Bureau of Investigation (FBI). In addition, personal information about that individual, stored in the database, or other databases, may be immediately accessed and transmitted to the emergency response agency, as well as realtime imagery of the sports venue and/or other related information (e.g., the section, row and seat number on the ticket the individual presented upon entering the sports venue), in order to assist emergency response agency personnel in locating and/or tracking the individual within the sports venue.

In yet another example, the additional information may take the form of sound. A sensor, such as a microphone, or multiple sensors could be strategically positioned about the secure location 301 (e.g., the sensors may be colocated with each of the one or more cameras positioned at the secure location 301). Like the realtime video, or other realtime imagery, the sound signals generated by the sensor, or sensors, would be transmitted to the computer system 307 over a high-speed communications link 304, and ultimately to the computer systems associated with the emergency response agencies 309-313 and/or the emergency response units 315-319. Moreover, sound reproduction devices may also be positioned at the secure location 301, in order to facilitate two-way communication between emergency response personnel and one or more individuals at the secure location 301, should doing so prove to be advantageous.

In a related example, the additional information may take the form of voice data, where the voice data may be transmitted from the secured location 301 to the computer system 307 at the central monitoring station 305, and from there to the appropriate one or more emergency response agencies 309-313 and/or emergency response units 315-319. Likewise, voice data may be transmitted from an emergency response unit or agency to the secured location. The transmission of said voice data may be achieved over the network or any portion thereof using Internet Voice or, as it is more commonly known, Voice over Internet Protocol (VoIP).

In general, VoIP permits parties to place telephone calls or communicate voice over a broadband network connection using packet switching technology. VoIP is well-known. This added feature, however, will provide an efficient and convenient way for emergency response personnel to communicate with one or more parties at or in the secured location 301, be they additional emergency response personnel, property owners, victims or otherwise.

In accordance with one embodiment employing VoIP, voice transmission and receive equipment may be located at one or more positions at or in the secured location 301. The equipment may include, for example, a speaker(s), a receiver(s) and a codec(s) for converting the voice signals to and from digital signals. Upon the generation of an alarm signal, a channel may be established between an IP address associated with the secured location 301 and an IP address associated with the compute system 307 at the central monitoring station 305, one or more emergency response agencies 309-313 and/or one or more emergency response units 315-319.

In accordance with another aspect of the present invention, the high speed communications link 304 may be employed to carry signals to the imaging sensor at the secured location 301 for the purpose of controlling, for example, the field of view of the image sensor, the image focus, or which of several sensors are to provide imagery at a given time. The ability to remotely control one or more image sensors at the secured location 301, using control signals transmitted over a high-speed communications link, along with some of the aforementioned additional information such as a building layout or floor plan, may provide emergency response personnel with the ability to follow (i.e., track) a person or ongoing situation in realtime, thereby enhancing the agency's chances of apprehending the person or averting the emergency situation.

It is clear that numerous modifications and alternative embodiments and aspects of the present invention will be apparent to those skilled in the art in view of the foregoing description. The above description is to be construed as illustrative only, and is for the purpose of teaching those skilled in the art the best mode of carrying out the invention. The details of the present invention described above may be varied substantially without departing from the spirit of the invention, and the exclusive use of any modification which comes within the scope of the appended claims is reserved.

The invention claimed is:

1. A security system comprising:

an imaging device positioned at a secured location;

a computer system associated with a security system central monitoring station, said computer system configured to:

receive real-time imagery data from said secured location;

process the received imagery data;

generate additional information associated with the received imagery data;

identify an appropriate response agency from amongst a plurality of response agencies based on at least one of the additional information and the imagery data; and transmit the received imagery data and the additional information to a computer system associated with a response agency.

2. The security system of claim 1, wherein:

the real-time imagery data received from said secured location includes biometric information from an individual located at the secured location; and the computer system associated with the security system central monitoring station is further configured to analyze the biometric information.

3. The security system of claim 2, wherein:

the computer system associated with the security system central monitoring station is further configured to retrieve information concerning the individual who is present at the secured location based on the analysis of the biometric information; and wherein the additional information is the retrieved information concerning the individual.

4. The security system of claim 1, wherein the additional information is automatically generated by the computer system.

5. The security system of claim 1, wherein the additional information is generated by personnel associated with the security system central monitoring station.

6. The security system of claim 1, wherein the additional information is voice data.

7. The security system of claim 6, wherein the computer system associated with the security system central monitoring station is configured to transmit the voice data using voice over internet protocol.

8. The security system of claim 1, wherein the additional information is related to the secured location.

9. The security system of claim 8, wherein the additional information reflects a structural attribute associated with the secured location.

10. The security system of claim 8, wherein the additional information reflects a physical condition associated with the secured location.

11. A method of securing a location comprising the steps of:

generating real-time imagery data at a secured location;

transmitting the real-time imagery data to a security system central monitoring station over a network connection;

processing the received imagery data at the security system central monitoring station;

generating additional information associated with the received imagery data; and transmitting the received imagery data and the additional information to a response agency over a network connection, wherein the response agency is identified from among a plurality of response agencies based on at least one of the additional information and the imagery data by a computer system at the security system central monitoring station.

12. The method of claim 11, wherein the real-time imagery data received from the secured location includes biometric information from an individual located at the secured location.

13. The method of claim 12, further comprising the steps of:

analyzing the biometric information;

retrieving information concerning the individual located at the secured location; and wherein the additional information transmitted to the response agency includes the information retrieved concerning the individual located at the secured location.

14. The method of claim 11, wherein the additional information is automatically generated by a computer system associated with the security system central monitoring station.

15. The method of claim 11, wherein the additional information is generated by personnel associated with the security system central monitoring station.

16. The method of claim 11, wherein the additional information is voice data.

17. The method of claim 16, wherein the step of transmitting the additional information includes transmitting the additional information over the network using voice over internet protocol.

18. The method of claim 11, wherein the additional information is related to the secured location.

19. The method of claim 18, wherein the data related to the secured location reflects a structural attribute associated with the secured location.

20. The method of claim 18, wherein the data related to the secured location reflects a physical condition associated with the secured location.

21. A method for providing real-time data to a response agency:

receiving real-time data from a secured location;

accessing additional information associated with the data;

identifying at least one response agency from amongst a plurality of response agencies based on the data; and transmitting the data and the additional information to at least one computer system associated with the selected response agency, wherein said receiving, accessing, identifying, and transmitting are performed by a computer system at a security system central monitoring station.

22. The method according to claim 21, wherein the additional information includes voice data transmitted via Voice over Internet Protocol (VoIP).

23. The method according to claim 21, wherein the additional information includes an assessment of the data.

24. The method according to claim 21, further comprising automatically generating the additional information.

25. The method according to claim 21, wherein the additional information includes further detailed information related to the data.

26. The method according to claim 21, wherein said transmitting includes routing voice signals over the Internet.

27. The method according to claim 21, wherein said transmitting includes carrying audio signals over a packet-switching network.

28. The method according to claim 21, wherein the at least one selected response agency includes a mobile unit to which the data is transmitted.

29. The method according to claim 21, further comprising receiving audio signals over a packet-switching network from the at least one computer system associated with the at least one selected response agency.

30. The method according to claim 21, wherein the real-time data is received from the secured location over a packet switching network, the real-time data including audio data.

31. A method of securing a location comprising the steps of:

generating real-time imagery of a secured location;

transmitting the real-time imagery to a security system central station over a network connection;

processing the real-time imagery at the security system central station;

transmitting the real-time imagery from the security system central station to a response agency over a network connection; and displaying the real-time imagery at the response agency, wherein the response agency is identified from amongst a plurality of response agencies by a computer system at the security system central station.

* * * * *